United States Patent
Foreman, Jr.

(10) Patent No.: US 7,465,086 B1
(45) Date of Patent: Dec. 16, 2008

(54) ADJUSTABLE LENGTH THERMOWELL

(75) Inventor: Timothy H. Foreman, Jr., Houston, TX (US)

(73) Assignee: Foreman Instrumentation & Controls, Inc., Houston, TX (US)

( * ) Notice: Subject to any disclaimer, the term of this patent is extended or adjusted under 35 U.S.C. 154(b) by 0 days.

(21) Appl. No.: 11/369,063

(22) Filed: Mar. 6, 2006

Related U.S. Application Data (60) Provisional application No. 60/659,028, filed on Mar. 5, 2005.

(51) Int. Cl.
*G01K 1/08* (2006.01)
*G01K 7/02* (2006.01)
*G01K 1/14* (2006.01)

(52) U.S. Cl. ............... 374/143; 374/208; 374/179; 374/141; 136/200; 73/866.5

(58) Field of Classification Search ......... 374/208, 374/179, 163, 141, 143, 144, 142, 183, 100; 33/295–296, 809–813; 813/809–813, 295–296; 136/200; 73/866.5
See application file for complete search history.

(56) References Cited

U.S. PATENT DOCUMENTS

| | | | | |
|---|---|---|---|---|
| 1,979,085 A | * | 10/1934 | Vollrath | 136/235 |
| 2,838,935 A | * | 6/1958 | Di Cecio et al. | 338/28 |
| 3,246,521 A | * | 4/1966 | Humphrey | 374/148 |
| 3,501,957 A | * | 3/1970 | Jones, Jr. | 374/140 |
| 3,589,192 A | * | 6/1971 | Sabovik | 136/230 |
| 3,635,087 A | * | 1/1972 | Conklin | 374/137 |
| 3,751,305 A | | 8/1973 | Huebscher | |
| 3,753,787 A | | 8/1973 | Webb | |
| 3,855,710 A | * | 12/1974 | Lunden | 33/295 |
| 3,930,892 A | | 1/1976 | Fox et al. | |
| 4,259,123 A | | 3/1981 | Tymkewicz | |
| 4,376,227 A | * | 3/1983 | Hilborn | 136/242 |
| 4,558,959 A | | 12/1985 | Thomas et al. | |
| 4,588,377 A | * | 5/1986 | Kohn et al. | 432/50 |
| 4,590,326 A | * | 5/1986 | Woldy et al. | 136/233 |
| 4,628,141 A | | 12/1986 | Wieszeck et al. | |
| 4,630,939 A | * | 12/1986 | Mayes | 374/135 |
| 4,749,415 A | * | 6/1988 | Barton | 136/230 |
| 4,826,540 A | | 5/1989 | Mele | |
| 4,875,782 A | * | 10/1989 | Fox | 374/148 |
| 4,963,194 A | * | 10/1990 | Mele | 136/221 |
| 5,185,996 A | * | 2/1993 | Smith et al. | 60/772 |
| 5,230,745 A | | 7/1993 | Chretien et al. | |

(Continued)

OTHER PUBLICATIONS

Omega Engineering, Inc.; "Adjustable Depth Thermocouples"; The Temperature Handbook; Omega.Com; Stamford, CT 06907-0047 USA, Copyright 2002.

*Primary Examiner*—Gail Verbitsky
(74) *Attorney, Agent, or Firm*—Stephen S. Hodgson (57) ABSTRACT

A thermowell mounting assembly and method which allow a finite-length thermowell tube to be precisely adjusted by length during field installation to a desired position within a machine, process unit, or other location to be evaluated by a thermocouple. The adjustable length thermowell protects the thermocouple from a harsh process environment while simultaneously facilitating temperature measurement by the thermocouple at the adjusted length of the thermowell. Adjustment of thermowell length is achieved by rotation of the thermocouple-thermowell assembly from a position exterior to a mounting flange connected to the machine or process unit.

11 Claims, 9 Drawing Sheets

U.S. PATENT DOCUMENTS

| | | |
|---|---|---|
| 5,399,018 A | 3/1995 | Hollander et al. |
| 5,632,557 A * | 5/1997 | Simons ........................ 374/148 |
| 5,674,009 A | 10/1997 | Stark |
| 6,020,552 A * | 2/2000 | Rickman ..................... 136/230 |
| 6,045,261 A * | 4/2000 | Rossum et al. ............... 374/208 |
| 6,220,749 B1 * | 4/2001 | Wyker ......................... 374/141 |
| 6,227,703 B1 | 5/2001 | DiMatteo et al. |
| 6,231,230 B1 * | 5/2001 | Baldock et al. .............. 374/208 |
| 6,302,578 B1 * | 10/2001 | Stevenson et al. ........... 374/179 |
| 6,457,857 B1 * | 10/2002 | Gul ............................. 374/208 |
| 6,536,950 B1 * | 3/2003 | Green et al. ................. 374/179 |
| 6,599,012 B2 * | 7/2003 | Gul ............................. 374/208 |
| 7,153,023 B2 * | 12/2006 | Howard et al. .............. 374/144 |
| 7,165,883 B2 * | 1/2007 | Nimberger et al. .......... 374/148 |
| 2002/0085617 A1 * | 7/2002 | Gul ............................. 374/208 |
| 2002/0159500 A1 | 10/2002 | Green et al. |
| 2003/0026742 A1 | 2/2003 | Wu et al. |
| 2004/0114664 A1 * | 6/2004 | Park ............................ 374/179 |
| 2005/0152433 A1 * | 7/2005 | Howard et al. .............. 374/208 |
| 2006/0176931 A1 * | 8/2006 | Miyahara et al. ............ 374/208 |
| 2007/0258505 A1 * | 11/2007 | Jindal et al. ................. 374/179 |

* cited by examiner

ADJUSTABLE LENGTH THERMOWELL

CROSS REFERENCE TO RELATED APPLICATION

This application is based upon provisional application 60/659,028 filed on Mar. 5, 2005, the priority of which is claimed.

BACKGROUND OF THE INVENTION

1. Field of the Invention

This invention relates generally to temperature measurement devices and specifically to adjustable length thermocouple and/or thermowell mounting systems.

2. Description of the Prior Art

Thermocouples are widely used for temperature measurement of machines and processes in the chemical, petroleum, electronics, food, manufacturing and various other industries. Temperature measurement of chemical processes, for example, requires the placement of thermocouples in process units, such as columns, strippers, scrubbers, and reactors. To ensure reliable, efficient operation and process control, process unit temperature is continuously monitored using several thermocouples embedded at various locations within the process unit. Each thermocouple is typically mounted into the wall of the process unit by threading or otherwise securing the thermocouple through a mounting flange or similar measurement port. The thermocouple secured through a mounting flange may be protected on the process unit interior by a thermowell, which is attached to the internal side of the measurement port and acts to shield the thermocouple from harsh process conditions. Alternatively, the thermocouple may be protected by an integrated thermocouple assembly or armor, where the thermocouple wires are encased within an inner protection tube, an inner filler material, and outer sheath or sheaths, all constructed of various chemical compositions.

The accurate measurement of temperature at a specific location on the interior of a process unit requires that the end of the thermocouple be positioned at the specific location. Currently, the majority of process industries either custom make or special order thermocouples or thermowells of varying lengths in order to facilitate temperature measurement at various locations within the interior of a process unit. A thermowell is a hollow tube in which a thermocouple is mounted and serves to protect the thermocouple from the environment in which it is placed to measure temperature. The fixed length thermocouple or thermowell is secured to the measurement port without the ability to adjust the depth of the thermocouple or thermowell within the process unit. Where harsh process conditions are encountered, a thermocouple or thermowell may have a relatively short operational life before failing. The need for comprehensive temperature measurement therefore requires process unit operators to maintain an extensive inventory of replacement thermocouples or thermowells of varying lengths or to be prepared to have them custom made, in order to satisfy the varying thermocouple or thermowell lengths required at specific measurement locations. Thus, thermocouple or thermowell replacement can be both logistically problematic as well as expensive.

Increasing the service life of thermocouples that operate in harsh environments has been the focus of much research and prior invention. However, improving the ease of thermocouple installation has not received as much attention, especially for thermocouples operating in harsh process conditions that require a thermowell for protection. An adjustable depth thermocouple system has been suggested by Mele in U.S. Pat. Nos. 4,826,540 and 4,963,194 for use in machine bodies. The '540 and '194 systems include a hollow thermocouple fitting having external threads for engagement with the internal threads of a thermocouple orifice or well and internal threads adapted for engagement with the spiral surface features of a conventional or armored thermocouple cable. In the Mele adjustable depth thermocouple system, the thermocouple is threaded through the orifice or well until the thermocouple touches the bottom of the thermocouple orifice and proper compression of the resilient material at the surface of the cable is attained. The thermocouple can then be secured in position using a number of suggested locking methods.

The adjustable thermocouple mounting systems described in the prior art have mainly been designed for use in machine bodies or operations with conditions not requiring the use of a protective thermowell. Adjustable thermocouple mounting systems for use in harsh operation environments, such as severe temperature and pressure, require additional considerations not adequately addressed by the current prior art. For example, U.S. patent application 2003/0026742 of Wu et al. describes an adjustable length thermocouple for a fixed length, non-adjustable thermowell. However, the Wu device will result in measurement error when the tip of the thermocouple is retracted from the end of the fixed length thermowell, because any space between the tip of the thermocouple and the end of the thermowell will insulate the thermocouple. In addition, U.S. Pat. No. 5,674,009 issued to Stark describes an adjustable length thermocouple sheath that can be shortened in length by breaking off segments of the sheath at existing stress fracture points created in and along its shaft. However, the Stark device does not permit lengthening of the sheath shaft or provide an adequate pressure seal once the sheath is shortened.

Specifically, an adjustable thermocouple mounting system for use in harsh operating conditions requires a thermowell that is also adjustable and is arranged to maintain a pressure seal with the machine or process unit after installation, that has adequate safeguards to prevent thermocouple back out or blowout under high pressures, and that provides precise thermocouple positioning at installation. Therefore, an adjustable thermowell mounting system is needed that allows a thermocouple-thermowell assembly to be easily adjusted in length to achieve a proper position within a machine or process unit for accurate temperature measurement.

3. Identification of Objects of the Invention

A primary object of the invention is to provide an adjustable thermowell mounting system that allows a thermocouple-thermowell assembly to be quickly adjusted in length to a desired position within a machine or process unit during field installation.

Another object is to provide an adjustable thermowell mounting system that allows a thermocouple-thermowell assembly to be precisely adjusted in length to a desired position within a machine or process unit during field installation.

Another object is to provide an adjustable thermowell mounting system that maintains a pressure seal with a machine or process unit after the thermocouple-thermowell assembly is installed and adjusted in length to a desired position within a machine or process unit.

Another object is to provide an adjustable thermowell mounting system that prevents thermocouple-thermowell assembly blowout or discharge after a thermocouple-thermowell assembly is installed and adjusted by length to a desired position within a machine or process unit.

Other objects, features, and advantages of the invention will be apparent to one skilled in the art from the following specification and drawings.

SUMMARY OF THE INVENTION

The objects identified above, along with other features and advantages of the invention are incorporated in an adjustable thermowell mounting system for mounting a thermocouple-thermowell assembly in a flange or wall of a machine or process unit. A longitudinal aperture extends from an outer side to an inner side of the wall or flange and is substantially aligned with a longitudinal passage of the process unit. A hollow internal fitting is coupled for example by threading, to the aperture of the wall or flange and extends inwardly from the wall or flange with the longitudinal axes of the aperture, internal fitting and the process unit longitudinal passage substantially aligned. The internal fitting includes internal female threads spaced inwardly from the inner side of the flange wall.

A thermocouple-thermowell assembly is provided which includes a hollow thermowell tube with a thermocouple mounted inside the thermowell tube. The hollow thermowell tube has a shaft and a closed tip at its end and includes external male threads spaced along a length inwardly from the tip. The external male threads have an outer diameter greater than that of the shaft of the thermowell tube. The thermowell tube and aperture of the wall or flange are cooperatively arranged so that the hollow shaft of the thermowell tube slides through the aperture of the flange and the hollow internal fitting with the tip of the thermowell tube extending into the longitudinal passage of the process unit. As the thermowell tube passes through the internal fitting, a point is reached where the male threads of the length of the thermowell tube engage the female threads of the internal fitting. Turning the thermocouple-thermowell assembly causes the thermowell tube to translate longitudinally with respect to the wall or flange because of the screwing of the male threads of the thermowell tube with the female threads of the internal fitting.

A hollow exterior fitting is provided to slide over an outer portion of the shaft of the hollow thermowell tube. After the desired longitudinal position of the thermowell tube is reached by screwing it into the internal fitting, the hollow exterior fitting is slid toward the outer side of the flange or wall and coupled to the flange or wall, for example, by threading into the flange aperture. Locking and sealing members lock the exterior fitting in place longitudinally to the outer side of the flange or wall and seal the exterior fitting to the exterior of the thermowell shaft. A preferred locking and sealing arrangement includes external male threads on the hollow exterior fitting and swage-type compression fitting engaged between the shaft of the thermowell tube and the exterior fitting by a cap with female threads for threading onto outer threads of the exterior fitting while compressing the compression seal.

According to one feature of the invention, the female thread pattern of the hollow internal fitting coupled to the internal side of the flange or wall and the male thread pattern of the thermowell tube are cooperatively advantageously constructed so that the internal depth of the thermocouple-thermowell assembly within the flange or wall is increased or decreased by a predetermined length with each revolution of the thermocouple-thermowell assembly.

According to another feature of the invention, the female thread pattern of the hollow internal fitting coupled to the internal side of the flange or wall is advantageously constructed so as to be of the reverse thread pattern of the external male threads on the hollow exterior fitting (for example, left-hand thread pattern for the internal female threads of the hollow internal fitting and right-hand thread patterns for the external male threads on the hollow exterior fitting) or other arrangement which secures the thermocouple-thermowell assembly in place. Such reverse thread pattern provides a built-in safety mechanism that inhibits the unintended back out of the thermocouple-thermowell assembly under extreme pressure. The reverse thread pattern causes the hollow exterior fitting, which secures the thermocouple-thermowell assembly in place, to tighten into the flange or wall if the thermocouple-thermowell assembly is urged to rotate out of the machine or process unit. Furthermore, the length of the hollow internal fitting coupled to the internal side of the flange or wall and its female thread length can be increased to provide greater stability to that portion of the thermocouple-thermowell assembly that is located on the interior of the machine or process unit. This greater stability, provided by increasing the length and thread length of the hollow internal fitting, further serves to prevent blowout of the thermocouple-thermowell assembly.

In a preferred embodiment of the invention, the thermocouple-thermowell assembly is an integrated unit with the thermocouple wires and their protective ceramics encased or otherwise protected by an attached thermowell tube. The thermocouple-thermowell assembly is created when the thermocouple is attached to or secured within the thermowell tube by a compression fitting or other means. However, other arrangements can be provided. For example, a thermocouple can be provided, without an integrated or attached thermowell tube. In other words, no thermowell tube is provided but the thermocouple has a longitudinal portion with external threads that engage the internal threads of the hollow internal fitting extending from the internal side of the flange or wall, thereby allowing the length of the thermocouple tube to be adjusted through the flange or wall.

An alternative embodiment of the invention includes a well, such as an instrument or sensor well, in place of the previously described thermowell tube. The sensor well is constructed to accept the placement of an instrument or other device therein in order to create an integrated assembly. As with the thermocouple-thermowell assembly, the integrated assembly is similarly employed in the adjustable mounting system of this invention.

BRIEF DESCRIPTION OF THE DRAWINGS

By way of illustration and not limitation, the invention is described in detail hereinafter on the basis of the embodiments represented in the accompanying figures, in which:

FIGS. 5A through 5E illustrate a method for assembling the thermocouple-thermowell assembly in a process unit where.

DESCRIPTION OF THE PREFERRED EMBODIMENTS OF THE INVENTION

The preferred embodiment of the invention alleviates one or more of the deficiencies described in the prior art and incorporates one or more the objects previously identified. A thermowell mounting system is provided that achieves advantages of precise field adjustability of thermocouple-thermowell depth, pressure seal creation with a machine or process unit after thermocouple-thermowell installation, and safety features which inhibit thermocouple-thermowell back out or blowout at high operating pressures.

The preferred embodiment also provides easier field installation, because one thermocouple-thermowell assembly of finite length can be precisely adjusted, within its range of adjustability, to any desired depth within the machine or process unit, without the need of a thermowell or orifice bottom for depth guidance. Providing a thermocouple-thermowell assembly of finite length but with the capability to adjust the depth of the thermocouple-thermowell assembly during field installation saves both the time and expense of ascertaining and stockpiling thermocouples and/or thermowells of varying lengths in order to fit particular application depths. The preferred embodiment of the invention is designed to provide an adjustable depth thermocouple-thermowell assembly for temperature measurement of machines and process units that operate at extreme temperatures and/or pressures. However, the invention could find application equally well in less extreme operating conditions or in any thermocouple application where adjustability of thermocouple length is desired.

Figure 1:
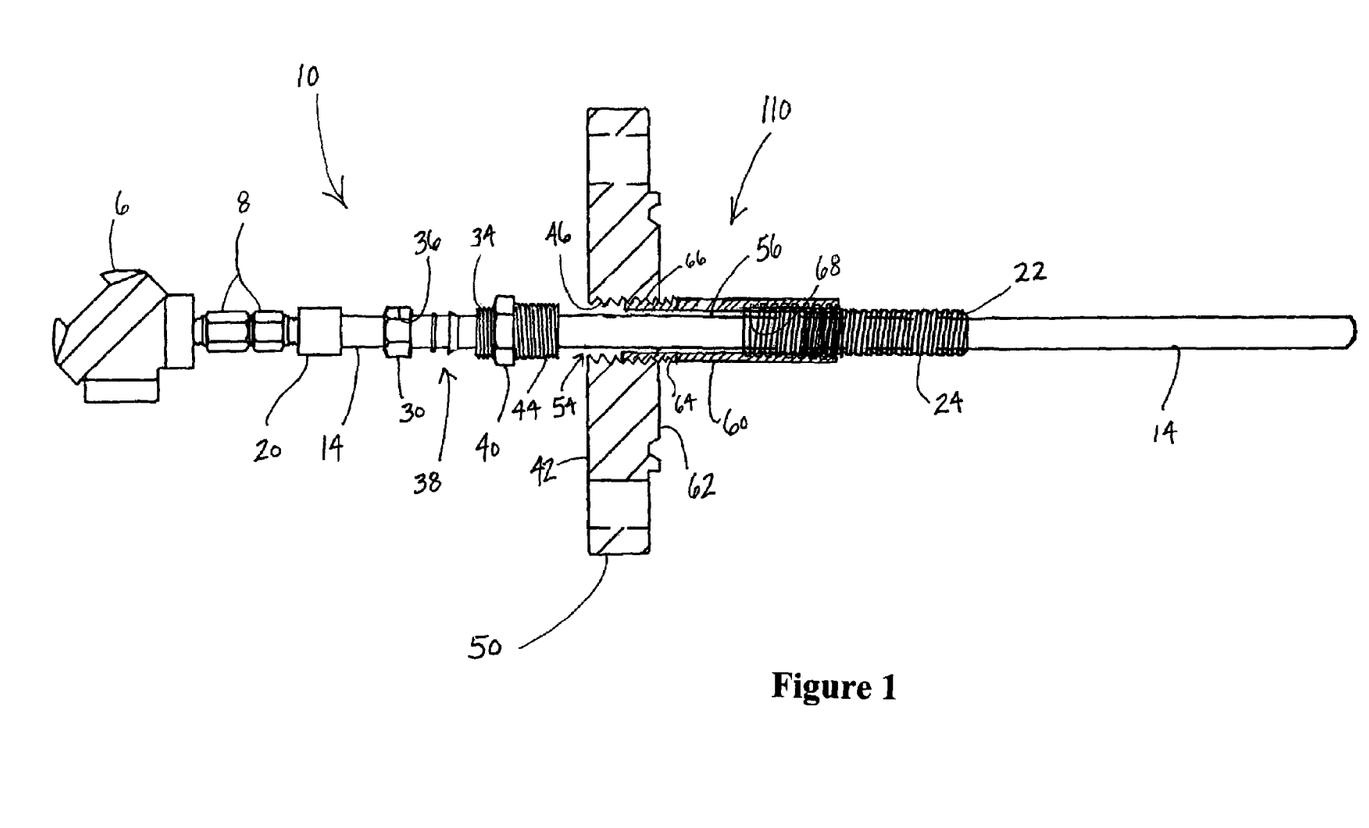
FIG. 1 illustrates a side view partially in cross-section of an adjustable thermowell mounting system and method according to the invention, showing a thermocouple-thermowell assembly which has been inserted into and threaded into a hollow internal tube attached to the internal side of a mounting flange and with a hollow external tube and locking and compression devices which can be used to lock and seal the thermowell tube to the mounting flange.
Figure 2A:
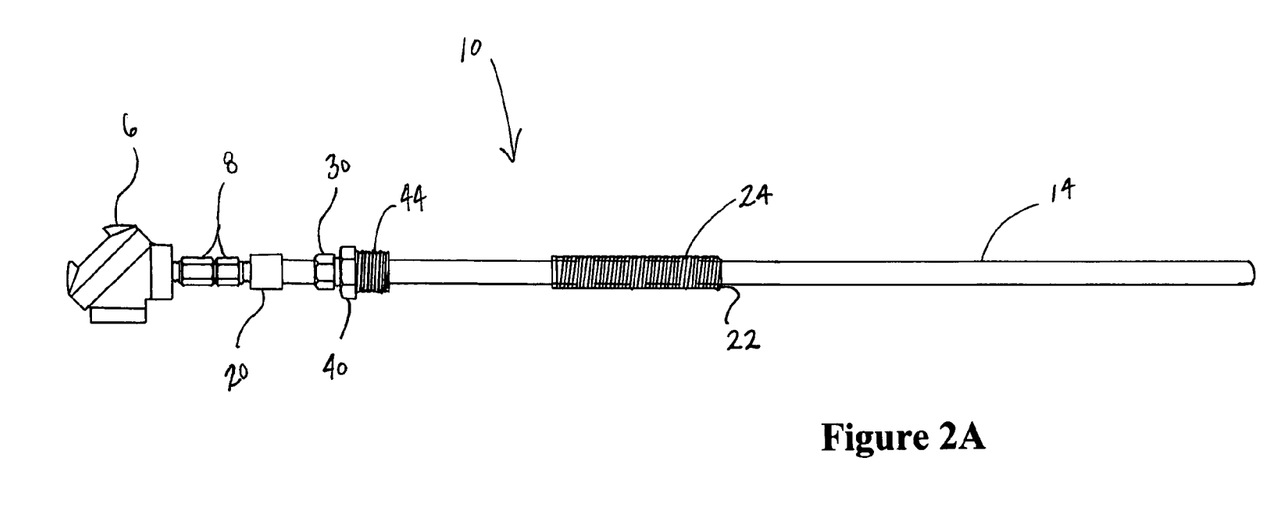
FIG. 2A illustrates an elevation view of a preassembled thermocouple-thermowell assembly prior to its installation into an adjustable thermowell mounting system.
Figure 2B:
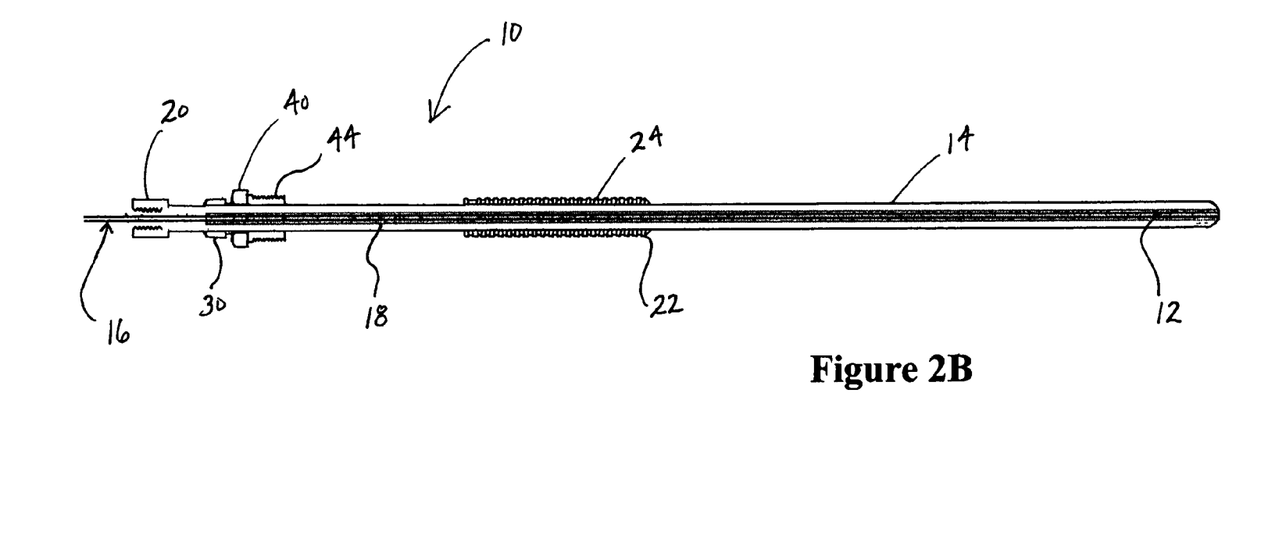
FIG. 2B illustrates a simplified cross-sectional view of the preassembled thermocouple-thermowell assembly illustrating the thermocouple inside the thermowell tube.

A preferred embodiment of the adjustable thermowell mounting system 110 is shown in FIGS. 1, 2A, and 2B and includes a thermocouple 12 preassembled into a thermowell tube 14 to form a thermocouple-thermowell assembly 10 which extends through a mounting flange 50. The preassembled thermocouple-thermowell assembly 10, with thermocouple head 6 and thermocouple seal 8, is shown in FIG. 2A. The embodiment of FIG. 1 features two separate fittings, 40 and 60. Compression or exterior fitting 40 extends outwardly from the external side 42 of the mounting flange 50. As shown in FIG. 1, exterior fitting 40 is a bored-through, ¾ inch diameter tube by 1 inch diameter pipe connector (for example) with male threads 44, which are arranged to be threaded into the internal female threads 46 of the mounting flange 50. At the opposite end, exterior fitting 40 has male compression seal threads 34 which thread with the internal female compression seal threads 36 of fitting cap 30. Additionally, a dual (two-piece) ferrule swage-type compression seal 38 is positioned between the male compression seal threads 34 and the cap 30 to create a compression seal between the exterior or compression fitting 40 and the thermowell tube 14 of the thermocouple-thermowell assembly 10. Before cap 30 is threaded onto exterior fitting 40, cap 30, the dual ferrule swage-type compression seal 38, and fitting 40 can each slide longitudinally along the exterior surface of thermowell tube 14.

Hollow internal fitting 60 extends inwardly from the internal side 62 of the mounting flange 50. It is a bored-through, 1 inch diameter machined piece that is 5¼ inches in length (for example). The internal fitting 60 has male threads 64 with a right-hand thread pattern on one end that are threaded into the female threads 66 of the mounting flange 50 as shown in FIG. 1 (see also FIG. 5A). Internal fitting 60 also has internal female threads 68 with a left-hand thread pattern (for example) which engage male threads 24 provided along a length on the external surface of thermowell tube 14. The left-hand female thread pattern 68 of the hollow fitting 60 is cooperatively arranged with the male threads 24 of thermocouple-thermowell assembly 10 so that one counterclockwise or clockwise rotation of the assembly 10 respectively moves the assembly 10 a distance of ¼ inch (for example) into or out of the mounting flange 50.

Figure 5A:
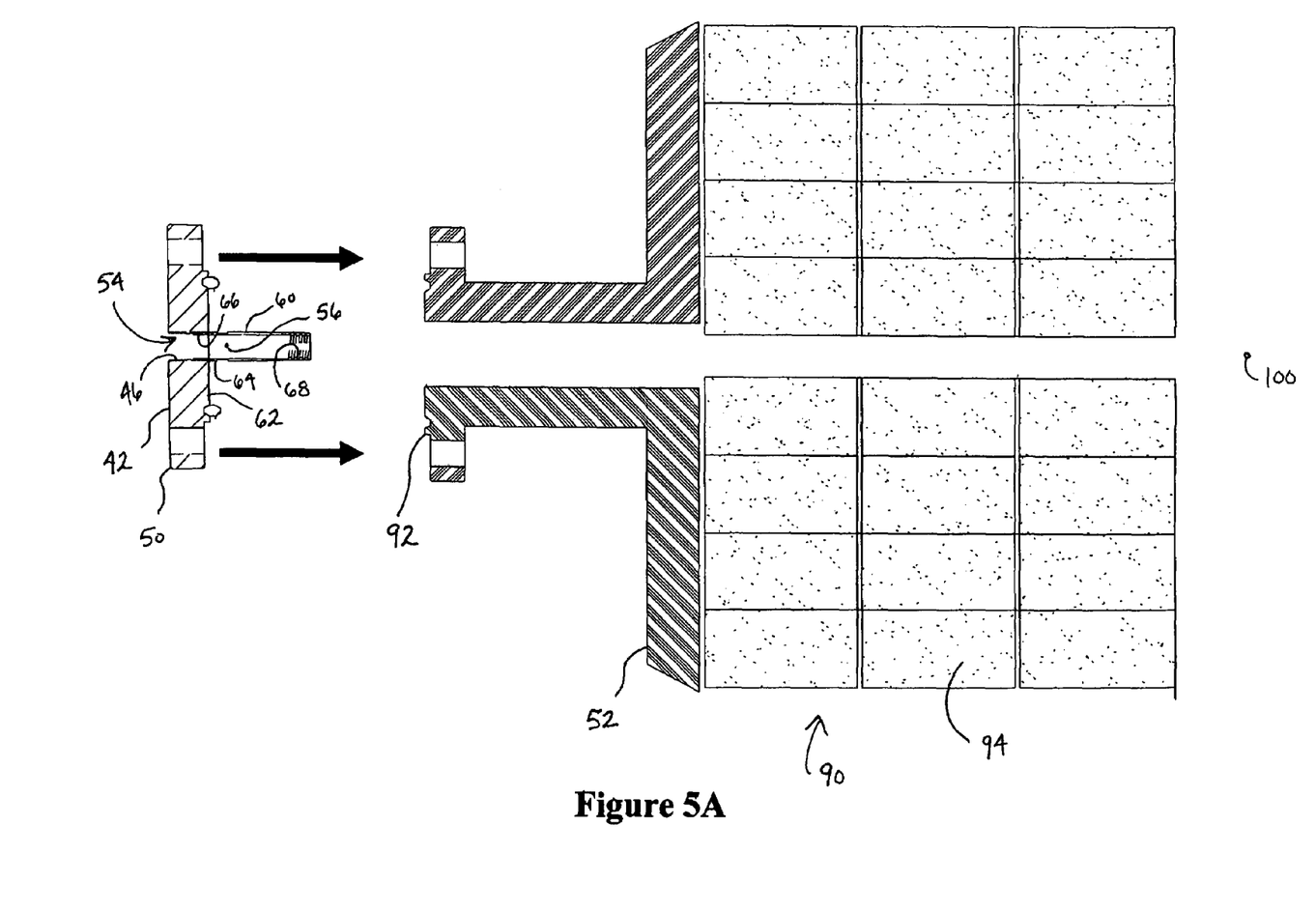
FIG. 5A illustrates an initial step where a hollow inner fitting is attached to the internal side of a mounting flange prior to the installation of the mounting flange to a process unit or machine, such as a gasifier nozzle.
Figure 5B:
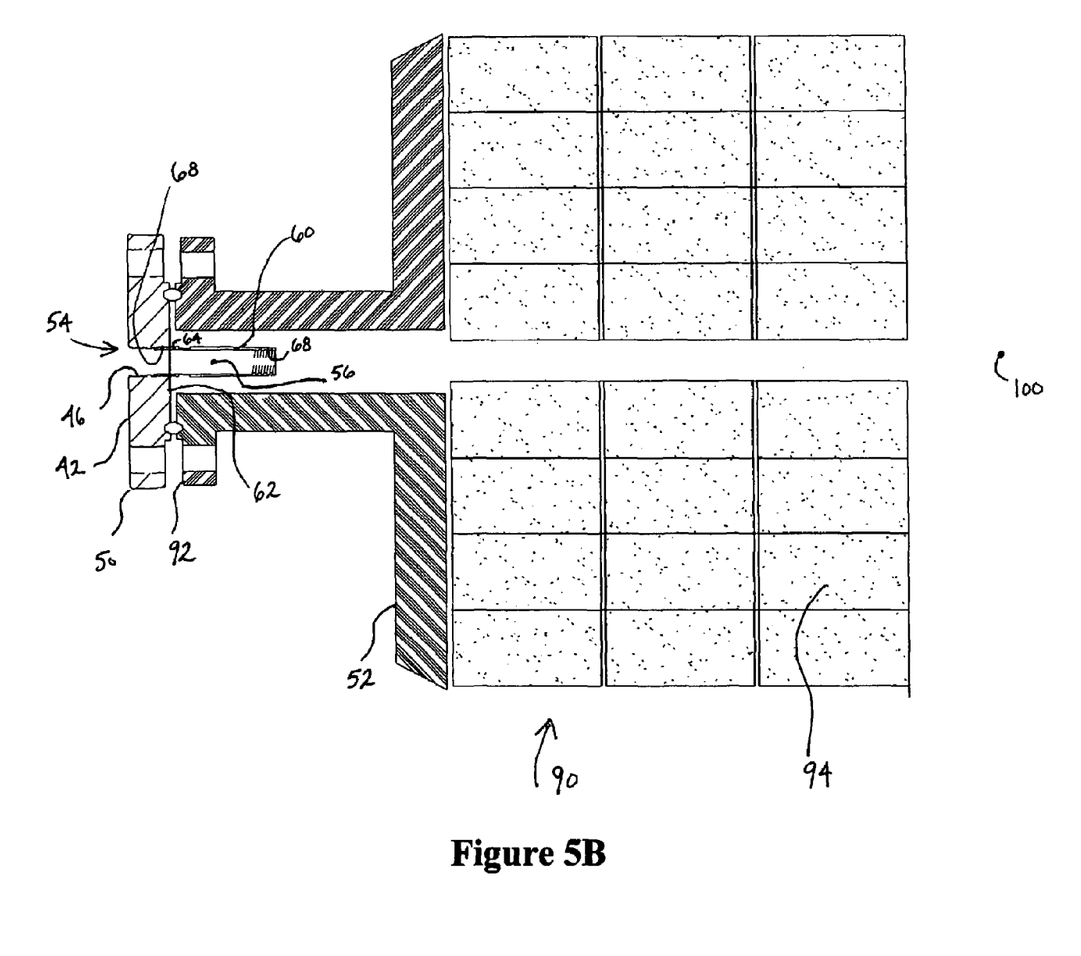
FIG. 5B illustrates a second step in the method of the invention where the mounting flange with the attached hollow fitting is installed onto a process unit or machine, such as a gasifier nozzle.

When coupled to the mounting flange 50, the hollow fitting 60 creates an inner passage 56 through the aperture 54 of mounting flange 50 for the placement of a thermocouple-thermowell assembly 10 therein (see also FIGS. 5A and 5B). Compression fitting 40 seal 38 and fitting cap 30 are also placed to slide along thermowell tube 14 on the external side of flange 50. In addition to using screw threads to couple the fittings 40, 60 to the mounting flange 50 or process wall 52 (see FIG. 5A for example), either one or both of the two fittings 40, 60 alternatively can be attached to the flange 50 or process wall 52 by welding, press-fitting, etc. While the fittings 40, 60 extending from the external 42 and internal 62 sides of the mounting flange 50 in the preferred embodiment are two separate pieces, one commercially available fitting 40 and one custom machined fitting 60, the two fittings 40, 60 can be custom machined as one-piece and secured through a flange or wall by threads, welding, press fitting, etc.

Figure 3:
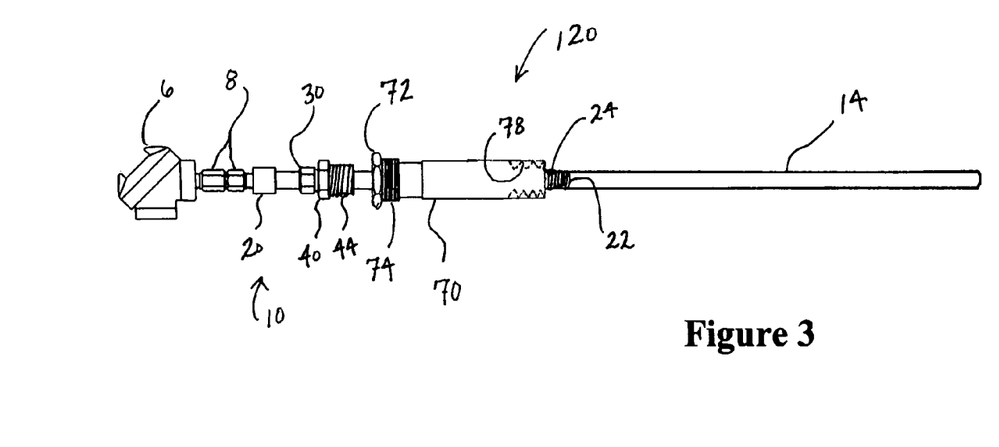
FIG. 3 illustrates an alternative embodiment with a one-piece hollow fitting that is inserted through the mounting flange aperture and secured to the exterior of the mounting flange and shows a thermowell tube inserted therein.

FIG. 3 shows an alternative preferred embodiment 70 of a one-piece hollow fitting that is inserted through the mounting flange aperture 54 and coupled to the mounting flange 50. Fitting 70 is a bored-through, 1 inch diameter tube by 1½ inch diameter pipe connector with male threads 74, which are threaded into the internal female threads 46 of the mounting flange 50 (see FIG. 1). In addition to threads, the one-piece hollow fitting 70 may also be coupled to the mounting flange 50 using welding, press fitting, or other means. At its external end 72, fitting 70 has internal female threads 76, which are arranged to receive the male threads 44 of compression fitting

40. The fitting 70 also has internal female threads 78 with a left-hand thread pattern (for example) which is arranged and designed so that one counterclockwise or clockwise rotation of the thermowell tube 14 of the thermocouple-thermowell assembly 10 moves the assembly 10 a distance of ¼ inch (for example) into or out of the mounting flange 50.

Figure 4A:
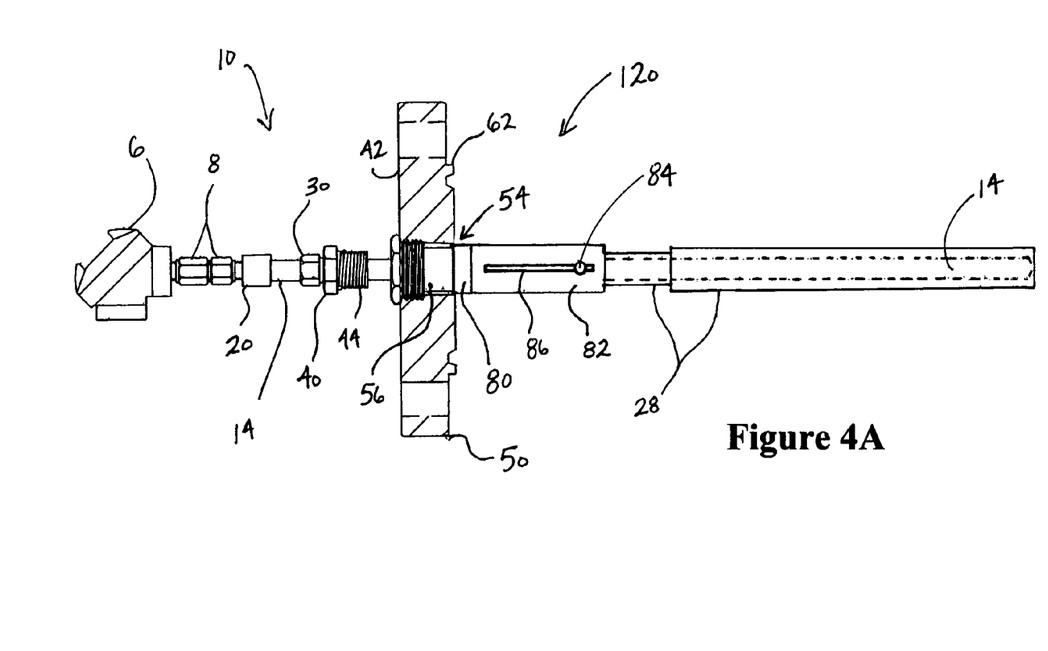
FIG. 4A illustrates an alternative embodiment of a one-piece hollow inner fitting that has the additional feature of a sliding outer protective sheath, which slides toward the interior of the process unit or machine as the thermocouple-thermowell assembly is rotated through the female threads of the hollow fitting.
Figure 4B:
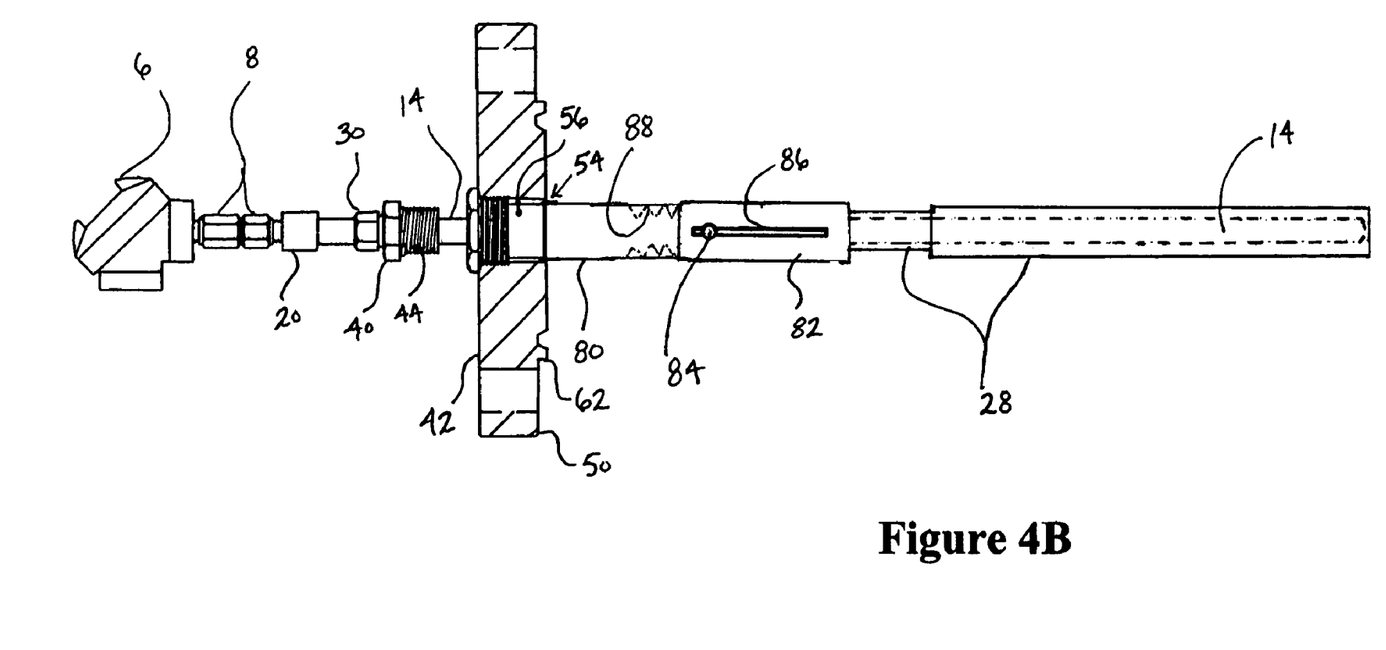
FIG. 4B illustrates the alternative embodiment of FIG. 4A when the sliding outer protective sheath is fully extended toward the interior of the process unit or machine.

Another alternative embodiment 80 of the one-piece hollow fitting 70 is shown in FIGS. 4A and 4B. Fitting 80 includes a sliding outer protective sheath 82, which, without rotating, slides toward the interior 100 (see FIG. 5A) of the process unit or machine 90 as the thermocouple-thermowell assembly 10 is rotated through the internal female threads 88 of fitting 80. A protective ceramic tube 28 secured to the interior end of sheath 82 protects thermowell 14 from a harsh environment of a process unit 90. For example, as the thermowell tube 14 moves longitudinally through fitting 80 by screwing its male threads 24 into female threads 88, a surface on the thermowell tube 14 engages a cooperative surface in the interior of sleeve 82 thereby driving sleeve 82 inwardly with the inward motion of the tube 14.

Fitting 80 has a guide pin 84 attached to its exterior surface near its internal end. The sliding outer protective sheath 82 has a slot 86 formed in its external surface through which the guide pin 84 couples the sheath 82 to the fitting 80. The slot 86 is arranged and designed to allow the sheath 82 to slide longitudinally, relative to the guide pin 84, over the exterior surface of the fitting 80 and beyond its internal end, as shown in FIG. 4B. Ceramic or metal tubular sections 28 are attached to the internal end of sleeve 82 to surround thermowell 14 to provide additional protection to the thermocouple-thermowell assembly 10 from harsh process conditions.

An advantage of the alternative embodiment 80 is the protection of outer surface ceramics 28 during the installation of the thermocouple-thermowell assembly 10. In process units with a refractory lining, the refractory 94 (see FIG. 5E) is typically rough and nonuniform, thereby causing the thermocouple-thermowell assembly 10 to contact the sides of the refractory 94 during installation. However, when using fitting 80, the outer protective sheath 82 and the attached ceramics/metal sleeves 28 only move longitudinally into and out of the interior 100 of the process unit or machine 90 even though the thermocouple-thermowell assembly 10 is being rotated through fitting 80 to adjust its depth. As a result, the alternative embodiment 80 greatly reduces the risk that a critical ceramic sleeve or tube 28 on the outer surface of the thermowell tube 14 that is attached to the sliding outer protective sheath 82 will be damaged by the refractory 94 during assembly 10 installation.

FIG. 2B illustrates the internal construction of the thermocouple-thermowell assembly 10. A thermocouple assembly 12 is encased or otherwise protected by a thermowell 14 constructed with a ¾ inch diameter. A ½ inch diameter male NPT (National Pipe Thread) compression fitting 20, which is used to secure the thermocouple assembly 12 inside the thermowell 14, is attached to the external end (i.e. the non-process side) of the hollow thermowell 14 by welding the fitting 20 into place. Fitting cap 30 and the dual ferrule swage-type compression seal 38 (see FIG. 1) are placed onto the thermowell 14 and positioned near the external end of thermowell 14. The compression fitting 40, which threads into the external side 42 of the mounting flange 50, is placed onto the thermowell 14 and positioned near the external end of the thermowell 14.

A metal sleeve 22 having male threads 24 with a left-hand thread pattern is welded onto the thermowell tube 14 at a location that will engage the left-hand female thread pattern 68 of the hollow internal fitting 60 attached to the internal side 62 of the mounting flange 50. Optionally, a metal or ceramic protection tube may be placed over the end of thermowell tube 14 to further protect the internal thermocouple assembly 12 from contamination and process conditions. The thermocouple 12, comprising thermocouple wires 16 and protective ceramics 18, is inserted into the hollow thermowell 14 at its external end. The thermocouple 12 is secured to the thermowell 14 using the ½ inch diameter female NPT compression fitting 20 previously attached to the external end of the thermowell tube 14.

Figure 5C:
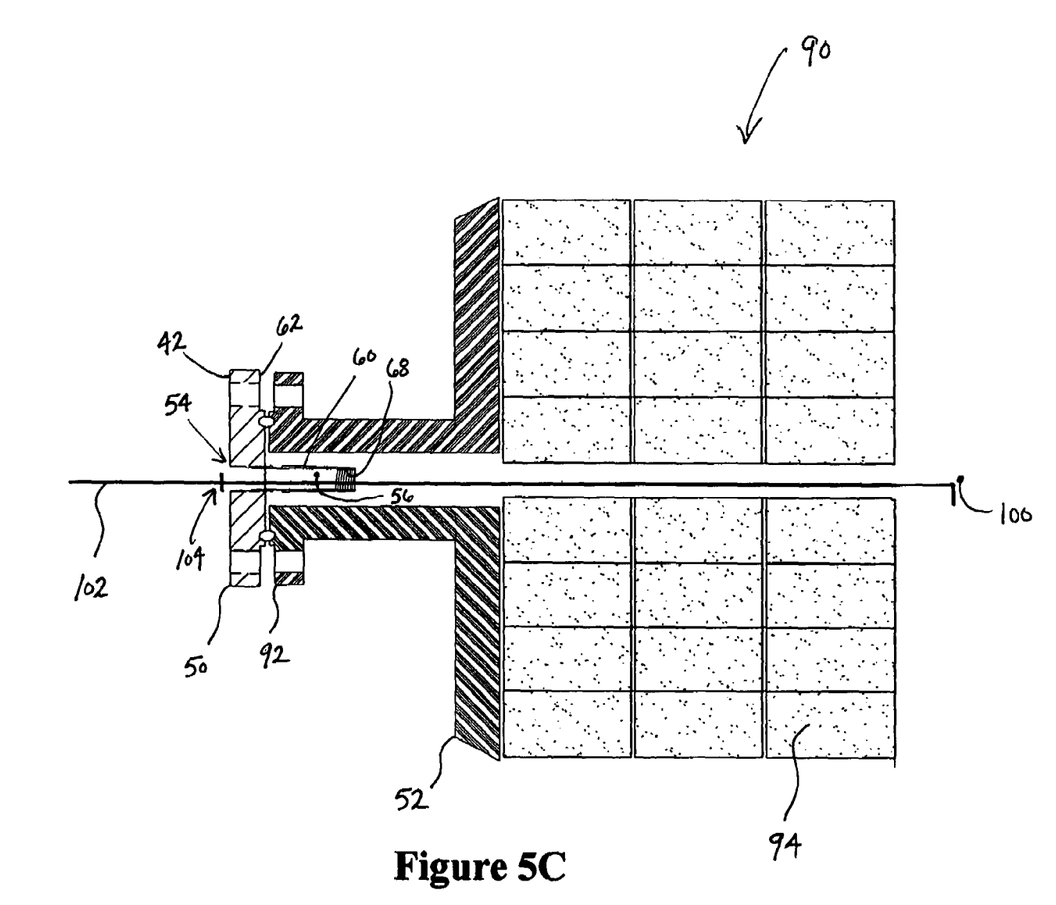
FIG. 5C illustrates a third step in the method of installing the thermocouple-thermowell assembly where the precise depth to which the thermocouple-thermowell assembly is to be adjusted is measured using a measuring tape or rod inserted through the mounting flange aperture.
Figure 5D:
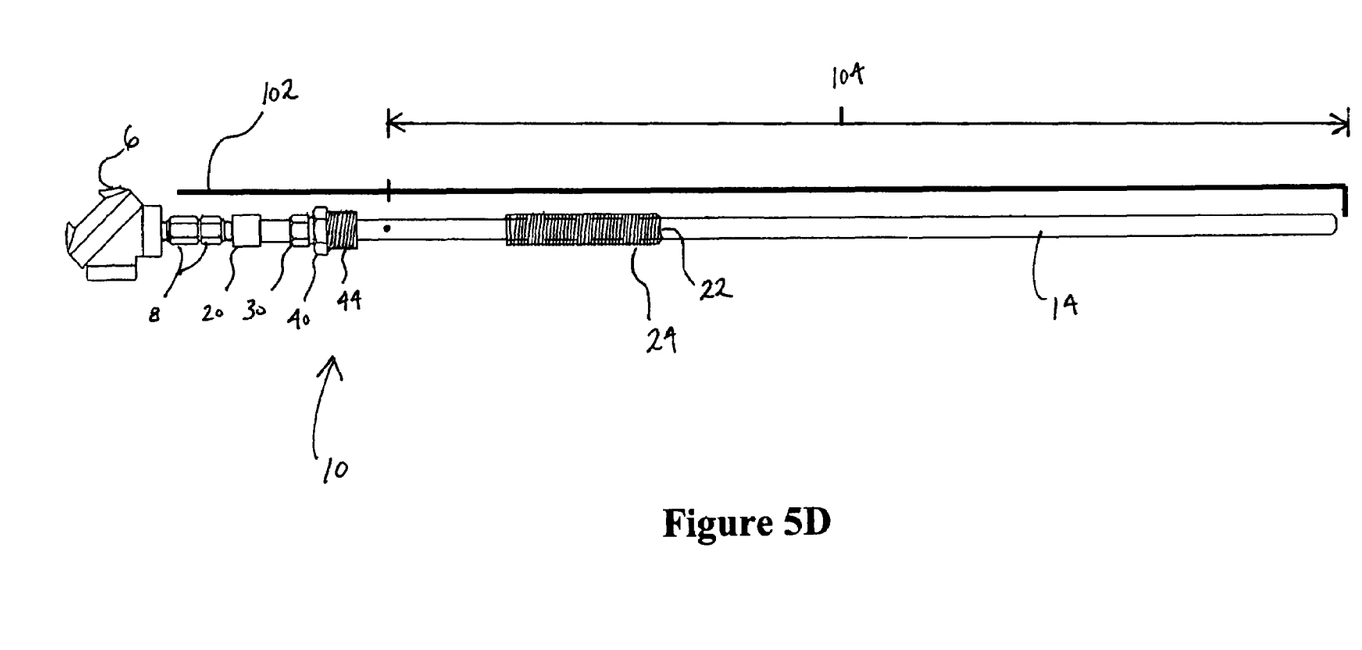
FIG. 5D illustrates a fourth step in the method where the depth measurement of FIG. 5C is marked on the thermowell tube of the thermocouple-thermowell assembly.

A preferred method of installing the thermocouple-thermowell assembly 10 is shown in FIGS. 5A through 5E. As illustrated in FIG. 5A, the hollow fitting 60 is attached to the internal side 62 of mounting flange 50 prior to its installation into a process unit or machine, such as a gasifier nozzle 90. Next, the mounting flange 50 is installed (FIG. 5B). The precise depth 104 that the thermocouple-thermowell assembly 10 should be positioned from the external side 42 of the mounting flange 50 is determined by measuring the distance using a measuring tape or rod 102 placed through the mounting flange aperture 54, as shown in FIG. 5C. Using the measuring tape or rod 102 as a guide, the precise depth 104 is marked on the thermocouple-thermowell assembly 10 (FIG. 5D). The thermocouple-thermowell assembly 10 is then inserted through the mounting flange 50 until the male threads 24 of metal sleeve 22 engage the left-hand female thread pattern 68 of hollow fitting 60.

The depth of the thermocouple-thermowell assembly 10 is adjusted entirely from outside the process unit 90 by rotating the entire assembly 10 through the mounting flange 50 so that the male threads 24 of metal sleeve 22 thread into the left-hand female thread pattern 68 of hollow fitting 60. As suggested in FIG. 5E, the thermocouple-thermowell assembly 10 is rotated until the precise depth 104 previously marked on the assembly 10 is aligned with the external side 42 of the mounting flange 50. Alternatively, if the thermocouple-thermowell assembly 10 is not marked with the precise depth 104 as previously measured, the depth of the assembly 10 can still be precisely adjusted, because each rotation of the assembly 10 increases the depth by ¼ inch. Thus, by simple calculation, the depth of the thermocouple-thermowell assembly 10 can be made to correspond to the desired depth 104 previously measured.

Figure 5E:
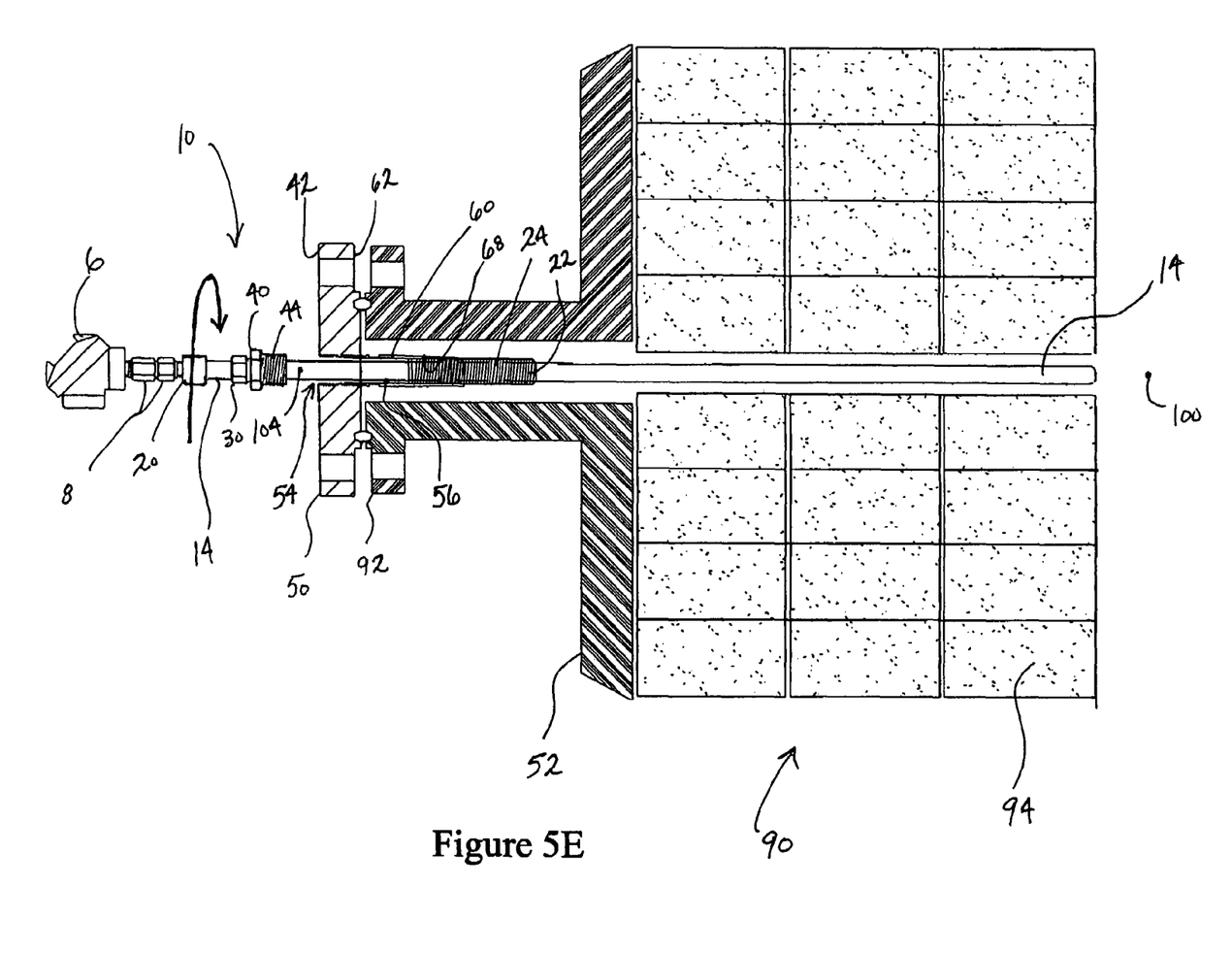
FIG. 5E illustrates a final step in the method of the invention where the thermocouple-thermowell assembly is inserted through the mounting flange aperture, threaded into the hollow fitting attached to the internal side of the mounting flange, and secured in place using a compression fitting threaded onto a hollow external fitting attached to the mounting flange.

After final adjustment of the thermocouple-thermowell assembly 10, the compression fitting 40, located on assembly 10 on the external side 42 of the mounting flange 50, is moved as by sliding to flange 50 and is threaded into flange 50. The thermocouple-thermowell assembly 10 is then secured in position by threading the male threads 44 on compression fitting 40 into the internal female threads 46 of the mounting flange 50. The fitting cap 30 is then tightened unto fitting 40 to compress the compression fitting ferrule 38 and seal the thermocouple-thermowell assembly 10 to the mounting flange 50. The two-piece ferrule swage-type compression seal 38 disposed between the fitting cap 30 and the male compression seal threads 34 of compression fitting 40 provides the pressure seal between the thermocouple-thermowell assembly 10 and the process unit 90.

The Abstract of the disclosure is written solely for providing the United States Patent and Trademark Office and the public at large with a means by which to determine quickly from a cursory inspection the nature and gist of the technical disclosure, and it represents solely a preferred embodiment and is not indicative of the nature of the invention as a whole.

While the preferred embodiment of the invention has been illustrated in detail, it is apparent that modifications and adaptations of the preferred embodiment will occur to those skilled in the art. Such modifications and adaptations are in the spirit and scope of the invention as set forth in the following claims:

What is claimed is:

1. A thermowell tube mounting assembly (110) for adjusting the position of a thermowell (14) to a desired depth (104) within the interior (100) of a process unit (90), said mounting assembly (110) comprising:
   a mounting flange (50) arranged and designed for coupling about an opening (92) in said process unit (90), said mounting flange (50) having an aperture (54) therethrough, wherein said process unit (90) is adapted to operate under pressure, and wherein said mounting flange (50) is adapted to provide a seal about said opening (92) for containing said pressure;
   an internal tube (60) coupled to an internal side (62) of said aperture (54) which provides an inner passage (56) between said aperture (54) and said internal tube (60);
   female threads (68) within said internal tube (60);
   a thermowell tube (14) having an external surface with male threads (24) positioned thereon to engage said female threads (68) of said internal tube (60), said thermowell tube (14) having a bore creating an inlet, said bore arranged and designed to accept a thermocouple assembly (12) therein, wherein said male threads (24) and said female threads (68) are adapted such that rotation of said thermowell tube (14) within said internal tube (60) adjusts the position of said thermowell tube 14 to said desired depth (104) within the interior (100) of said process unit (90); and
   a fastening mechanism (30, 40) which secures said thermowell tube (14) to said mounting flange (50), said fastening mechanism (30, 40) arranged and designed to prevent rotational or longitudinal movement of said thermowell tube (14) after said thermowell tube (14) is threaded through said female threads (68) of said internal tube (60) to a desired position within the interior (100) of said process unit (90), wherein said fastening mechanism (30, 40) is adapted to seal said thermowell tube (14) to said mounting flange (50) for containing said pressure in said process unit (90).

2. The assembly (110) of claim 1 wherein,
   said fastening mechanism (30, 40) is a compression fitting (30, 40).

3. The assembly (110) of claim 1 further comprising,
   a thermocouple assembly (12) disposed in said thermowell (14).

4. The assembly (110) of claim 3 wherein,
   said thermocouple assembly (12) is coupled to said thermowell tube (14) by a compression fitting (20).

5. The assembly (110) of claim 1 wherein said fastening mechanism (30, 40) includes an external tube (40) with threads (44) to couple the external tube (40) to the mounting flange (50) and a cap (30) to couple said thermowell tube (14) to said external tube (40).

6. The assembly (110) of claim 1 wherein,
   said female threads (68) within said internal tube (60) have a reverse thread pattern from other thread patterns used in said assembly (110).

7. The assembly (110) of claim 1 wherein,
   said process unit (90) is a gasifier (90).

8. A sensor well mounting assembly (120) for adjusting the position of a sensor well (14) to a desired depth (104) within the interior (100) of a process unit (90), said mounting assembly (120) comprising:
   a mounting flange (50) arranged and designed for coupling about an opening (92) in said process unit (90), said mounting flange (50) having an aperture (54) therethrough, wherein said process unit (90) is adapted to operate under pressure, and wherein said mounting flange (50) is adapted to provide a seal about said opening (92) for containing said pressure;
   a tube (60, 70, 80) coaxially aligned with said aperture (54) and which is coupled to said mounting flange (50), said tube (60, 70, 80) having female threads (68, 78, 88) therein;
   a sensor well (14) having an external surface with male threads (24) positioned thereon to engage said female threads (68, 78, 88) of said tube (60, 70, 80), said sensor well (14) having a bore creating an inlet, said bore arranged and designed to accept a sensor instrument (12) therein, wherein said male threads (24) and said female threads (68, 78, 88) are adapted such that rotation of said sensor well (14) within said tube (60, 70, 80) adjusts the position of said sensor well 14 to said desired depth (104) within the interior (100) of said process unit (90);
   a fastening mechanism (30, 40) coupling said sensor well (14) to said tube (60, 70, 80), said fastening mechanism (30, 40) preventing rotational or longitudinal movement of said sensor well (14) after said sensor well (14) is threaded through said female threads (68, 78, 88) of said tube (60, 70, 80) to a desired position within the interior (100) of said process unit (90), wherein said fastening mechanism (30, 40) is adapted to seal said sensor well (14) to said mounting flange (50) for containing said pressure in said process unit (90);
   a guide pin (84) coupled to an exterior surface of said tube (70, 80); and
   a cylinder (82) having a slot (86) formed in an exterior surface thereof, said guide pin (84) coupling said cylinder (82) to said tube (70, 80) through said slot (86), said slot (86) arranged and designed to allow said cylinder (82) to slide longitudinally across said tube (70, 80) and beyond an internal end of said tube (70, 80).

9. A method of adjusting the position of a sensor well (14) to a desired depth (104) within the interior (100) of a process unit (90), said method comprising the steps of:
   inserting a sensor instrument (12) into a sensor well (14);
   securing said sensor instrument (12) to said sensor well (14);
   coupling a tube (60, 70, 80) to a flange (50) having an aperture (54) therethrough, said tube (60, 70, 80) providing an inner passage (56) between said aperture (54) and said tube (60, 70, 80), said tube (60, 70, 80) having internal female threads (68, 78, 88) which are arranged and designed to engage male threads (24) on an external surface of said sensor well (14);
   coupling said flange (50) about an opening (92) in said process unit (90), said process unit having a wall defining an internal space, said opening (92) being in said wall and providing access to said internal space, wherein said wall has a wall thickness;
   measuring a desired depth (104) through said inner passage (56) from an external end of said tube (60, 70, 80) to an interior position (100) within said internal space in said process unit (90), wherein said desired depth (104) depends upon said wall thickness of said wall of said process unit;
   disposing said sensor well (14) within said tube (60, 70, 80) until said male threads (24) of said sensor well (14) engage said internal female threads (68, 78, 88) of said tube (60, 70, 80);
   rotating said sensor well (14) from a position exterior to said flange (50) to cause said male threads (24) to thread through said internal female threads (68, 78, 88) until said sensor well (14) translates the desired depth (104) into the interior (100) of said process unit (90); and coupling said sensor well (14) to said flange (50) to prevent rotational or longitudinal movement of said sensor well (14).

10. The method of claim 9 wherein, said sensor well (14) is a thermowell (14) and said sensor instrument (12) is a thermocouple (12).

11. The method of claim 9 wherein, said process unit (90) is a gasifier (90) adapted to operate under pressure and said wall includes a refractory lining, and wherein said flange (50) is adapted to sealingly couple about said opening (92) and sensor well (14) is adapted to sealingly couple to said flange (50) for containing pressure within gasifier (90).

\* \* \* \* \*